United States Patent [19]

Thomson

[11] Patent Number: 4,683,351
[45] Date of Patent: Jul. 28, 1987

[54] IMPEDANCE MAINTENANCE CIRCUIT FOR TELEPHONE INTERFACE

[75] Inventor: Robert G. Thomson, Tempe, Ariz.

[73] Assignee: GTE Communication Systems Corporation, Phoenix, Ariz.

[21] Appl. No.: 784,065

[22] Filed: Oct. 4, 1985

[51] Int. Cl.[4] ................ H04M 1/00; H04M 19/00
[52] U.S. Cl. .................................. 379/398; 323/314
[58] Field of Search ............. 179/81 R, 90 B, 90 BB, 179/90 BD; 323/313, 314, 315

[56] References Cited

U.S. PATENT DOCUMENTS 4,354,060 10/1982 Niertit et al. ................ 179/81 R Primary Examiner—James L. Dwyer
Attorney, Agent, or Firm—John A. Odozynski

[57] ABSTRACT

Circuitry for supplying power to low-level DIALER portions of a telecommunications integrated circuit device comprises a PNP current sourcing transistor mirrored to a bypass transistor. The bypass transistor is coupled across the TIP and RING terminals of the subscriber line so as to maintain current flow sufficient to prevent the central office from "dropping out". A sensing transistor drives a current sink coupled to the current sourcing transistor in order to prevent that transistor from dropping into saturation and degrading the necessarily high impedance level that must be presented across the subscriber line. Saturation is prevented through the operation of a circuit loop that includes the base-collector junction of the current sourcing transistor, the emitter to-base junction of the sensing transistor, and a voltage offset element. When the base-collector voltage of the current sourcing transistor approaches to a predetermined level determined by the voltage offset, the level chosen to be indicative of a tendency toward saturation, the sensing transistor begins to conduct, thereby driving a current sink into conduction and imposing an additional load on the current sourcing transistor. The additional load prevents the current sourcing transistor from falling into saturation.

15 Claims, 2 Drawing Figures

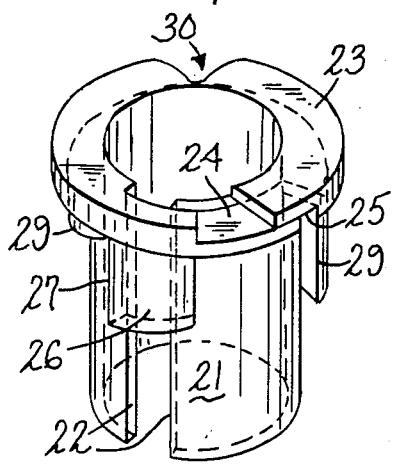
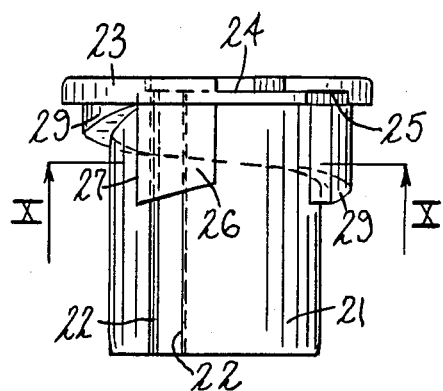
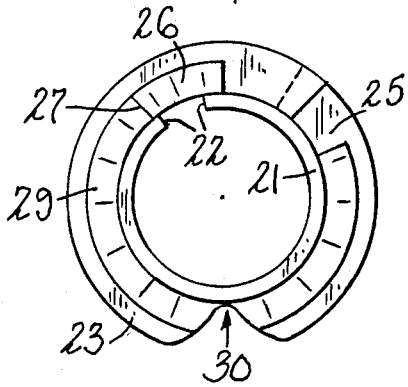
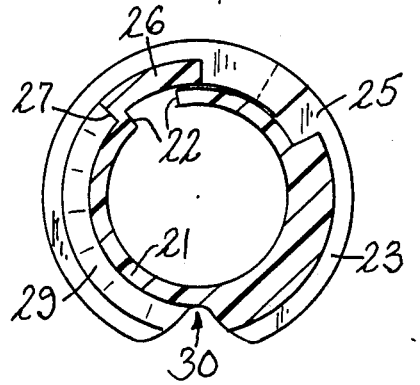

4,683,351

IMPEDANCE MAINTENANCE CIRCUIT FOR TELEPHONE INTERFACE

FIELD OF THE INVENTION

The invention relates to telecommunications interface circuitry and, more particularly, to a circuit for efficiently providing current to a pendant, relatively low-power "DIALER" circuit while adhering to telephone line interface impedance requirements.

BACKGROUND OF THE INVENTION

Prior to the subject invention, a specific integrated circuit device used in customer premises telephone applications had been configured as shown in FIG. 1. The device as shown therein includes both a VOICE circuit coupled across the input terminals (TIP and RING leads) and a low-level "DIALER" circuit. The DIALER circuit might include, for example, UDK or PULSE DIAL functions and repertoire dialing. Because the DIALER circuit imposes only modest current demands, on the order of 0.85 ma, its power may be derived from a large-valued capacitor, C1, charged through a series-connected resistor R1 and Schottky diode, CR1. The VOICE circuit, on the other hand, is required not only to supply a specified output power level but also to sink current in an amount equal to at least 8 ma in order to prevent the central office from "dropping out". In order to accomplish this, the prior art implementation had utilized a PNP bypass transistor (not shown in FIG. 1) to carry 8 ma from the TIP to the RING terminals of the subscriber line.

A salient component of the subject invention is a recognition that some part of that 8 ma may be used to charge C1 and thereby supply the current necessary for operation of the DIALER circuit. Two concerns are brought to bear on the design of a circuit intended to accomplish this result. First, because the impedance across the input terminals must be maintained at a specified high level, it is important that the bypass transistor not be driven into saturation. Second, the current driven into storage capacitor C1 must not be allowed to result in a voltage greater than the DIALER circuit can tolerate. It is expected that DIALER circuits with which the invention is used will require that the voltage across C1 be limited to a voltage within the range of 2.5 to 6.0 volts.

DISCLOSURE OF THE INVENTION

The above objects, advantages and capabilities are achieved in one aspect of the invention by an impedance maintenance circuit for an integrated power supply coupled across two terminals at the ends of signal-carrying lines. In one aspect of the invention, the power supply constitutes part of a telephone terminal apparatus so that the supply is required not only to maintain a minimum of current flow between the two terminals but also to supply a specified current to a pendant, low-level circuit that might include for example, dialer circuitry, a telecommunications microcomputer or a voice circuit for processing signals received from or transmitted to the central office. The impedance maintenance circuit includes a mechanism for maintaining the impedance presented across the two terminals by a current source transistor that supplies current to the pendant circuit. The mechanism senses a tendency of the source transistor toward saturation and, in response thereto, appropriately increases the load on that transistor so as to preclude saturation.

DESCRIPTION OF A PREFERRED EMBODIMENT

Figure 1:
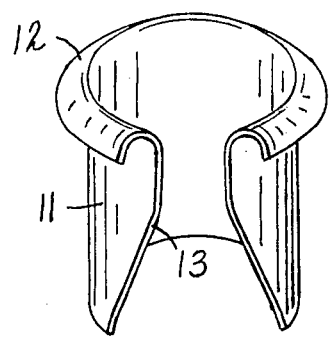
FIG. 1 is a block diagram of prior art configuration including, as does the subject invention, a telephone voice circuit and a DIALER circuit.
Figure 2:
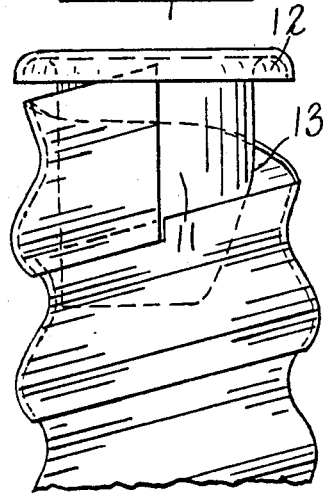
FIG. 2 is a schematic diagram of the subject Impedance Maintenance Circuit for Telephone Interface.
Figure 3:
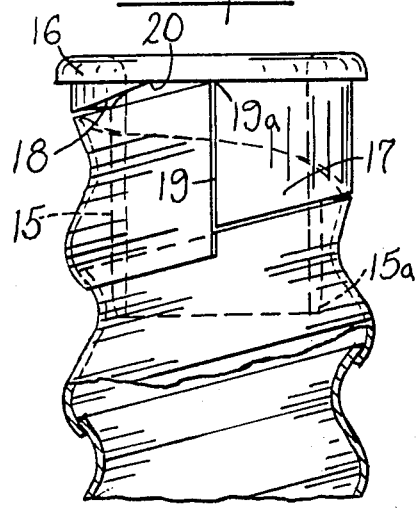
Figure 4:
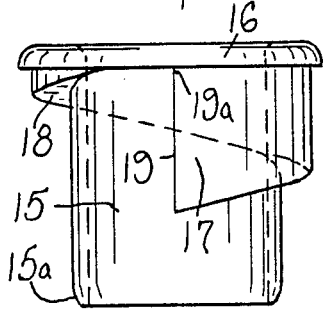
Figure 5:
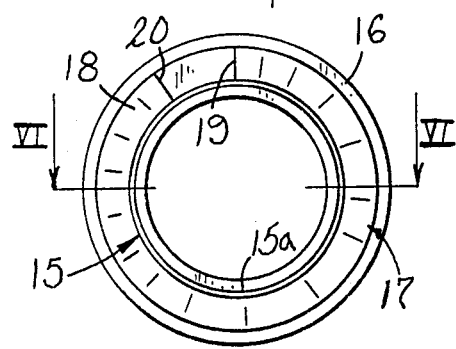
Figure 6:
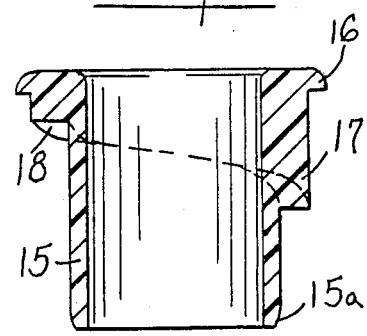

For a better understanding of the subject invention, reference is made to the following description and appended claims, in conjunction with the above-described drawings. Referring now to FIG. 2, the subject invention as depicted therein is incorporated as part of a telecommunications integrated circuit device that includes a VOICE circuit 1 and a DIALER circuit 2. The VOICE circuit is shown coupled across terminals V1 and V2 which may be understood as the TIP and RING terminals through which equipment at the customer premises is coupled to the telephone company central office. As indicated above, the DIALER circuit is a relatively low-level circuit and may require only 0.85 ma supply current in order to operate.

The telecommunication integrated circuit is also shown to include a first current sourcing, or, alternatively, bypass, PNP transistor Q1 coupled across terminals V1 and V2. Q1 has an emitter coupled to V1 through an emitter resistor R8 and a collector coupled to the VOICE circuit through resistor R1. The VOICE circuit provides the "off hook" current and the telephone voice signal to the central office. Q1 base current is provided primarily through the connection of the base of Q1 through R1 to the voice circuit. As alluded to above, Q1 maintains a minimum current flow from V1 to V2 in order to prevent the central office from dropping out during an off-hookswitch condition.

Current to the DIALER circuit is supplied by a second current sourcing transistor Q2 which has its base coupled to the base of Q1 in a current mirror configuration. Q2 emitter is coupled through resistor R9 to V1. The value of Q1 emitter resistor R8 is designed to be three times the value of Q2 emitter resistor R9 and the emitter areas of the two transistors are proportioned in an inverse manner (emitter area of Q2 is three times the emitter area of Q1) so that the current flowing through Q2 is substantially equal to three times the current flowing through transistor Q1. Q2 collector is coupled through Schottky diode D6 to the DIALER circuit and to a parallel-connected charge storage capacitor C1. The current stored in and resulting voltage developed across C1 powers the DIALER circuit in a well-understood fashion.

One of the pitfalls to be avoided in supplying current to the DIALER circuit through Q2 derives from the possibility that excessive base drive to Q2 or that lessening of the current load at Q2 collector, as when C1 becomes fully charged and the current drawn by the DIALER circuit diminishes, might cause Q2 to become saturated. When Q2 becomes saturated, its collector-base junction becomes forward biased and the impedance across V1 and V2 drops below an acceptable level.

In order to preclude such an event, an impedance maintenance circuit 30 is included to sense the tendency of Q2 toward saturation and, in response to such tendency, increase the current load at the collector of Q2. The impedance maintenance circuit includes a voltage offset element, 31, that includes resistor R2 and a current sink 310; current sink 310 in turn includes transistors Q5 and Q6 and associated resistors R4, R5, R6 and R7. The voltage offset element is coupled between the base of Q2 and the base of a PNP sensing transistor Q3. Q3 emitter is coupled to Q2 collector; Q2 collector is coupled to an impedance maintaining current sink 32. Current sink 32 includes transistor Q4 having a base coupled to the collector of Q3, a collector coupled to the collector of Q2, and an emitter coupled to V2. The base of Q4 is also coupled to V2 through a resistor R3.

In general, operation of the impedance maintenance circuit proceeds as follows. R1 and current sink 310 are designed so that the voltage offset between the base of Q2 and the base of Q3 is approximately one half the normal base-to-emitter forward voltage drop, Vbe. During normal operation Q2 collector-base junction will be significantly back biased and both Q3 and Q4 will be nonconducting. However, should Q2 tend toward saturation, for whatever cause, the voltage at the collector of Q2 will become less negative with respect to the voltage at its base. As the voltage at the collector of Q2 tends to become positive with respect to the voltage at its base (the definition of saturation), Q3 base-emitter junction becomes forward biased, thereby driving Q3 and, in turn, Q4 into conduction. The increased load on Q2 presented by Q4 collector current will prevent Q2 from falling into saturation.

In order to appreciate the manner in which this occurs, note that the base-collector junction of Q2, R2 of the voltage offset element, and the base-emitter junction of Q3 form a closed loop, so that their respective voltages must obey the relationship $Vcb(Q2) + V(R2) + Vbe(Q3) = 0$. Given that $V(R2) = -0.5$ Vbe, it can be seen that as Vcb (Q2) approaches zero volts, the emitter of Q3 becomes positive with respect to its base. Any further tendency of Q2 toward saturation places an additional forward bias across Q3 emitter-base junction. This will result in increased base drive to current sink Q4, which, in turn, holds Q2 out of saturation.

Because the voltage offset established across R2 determines the point at which sensing transistor Q3 begins to conduct, it is useful to know the manner in which that voltage is established. From FIG. 2 it can be seen that the current flowing through R2 consists essentially of the collector current of Q5, IcQ5, and that the voltage across R2 is, therefore, (IcQ5)(R2). The collector current of Q5 is determined by the voltage across emitter resistor R4. The voltage across R4 is, of course, established by the ratio of R5 to R6. Specifically, if R5 = R6/2, then IcQ5 is substantially equal to Vbe/2R4, where Vbe is understood to be the voltage drop across a forward-biased silicon PN junction. If R4 = R2, then it follows that the voltage across R2 is equal to Vbe/2. It should be noted, however, that unless IcQ5 is negligible with respect to the current through R1, a significant error term will be introduced into the above calculation.

In addition to the necessity to prevent the saturation of Q2, it is also necessary to limit the maximum voltage applied across the DIALER circuit. The voltage safely tolerated by such circuits can be expected to vary, but a range extending from 2.5 to 6.0 volts may be anticipated. In order to achieve this result a diode string, consisting of D1, D2, D3, D4, and D5, is connected between the collector and the base of Q4. If the voltage at the anode of D6 attempts to exceed 6Vbe, D1 through D5 and Q4 begin to conduct, thereby limiting the charge supplied to C1 and the voltage applied to the DIALER circuit.

Accordingly, although there has been disclosed and described what at present is considered to be the preferred embodiment of the subject invention, it will be obvious to those having ordinary skill in the art that various changes and modifications may be made therein without departure from the scope of the appended claims. For example, although the invention is described with respect to an integrated circuit implementation of telecommunications equipment, it clearly retains applicability with other types of equipment or with discrete implementations.

What is claimed is:

1. An impedance maintenance circuit for coupling between the TIP and RING leads of a telephone line and for providing an interface between the telephone line and at least two subsystem circuits wherein the two subsystem circuits impose substantially dissimilar current source requirements, the impedance maintenace circuit comprising:

a first current sourcing transistor coupled to the telephone line for supplying current to the first subsystem circuit;

a second current sourcing transistor coupled to the telephone line and coupled to the first current sourcing transistor in a current-mirror configuration for supplying current to the second subsystem circuit; and impedance maintenance means coupled between the collector and the base of the second current sourcing transistor for sensing the tendency of the second current sourcing transistor toward saturation and for increasing the current load on the second current sourcing transistor so as to prevent saturation and therefore maintain the impedance between the TIP and the RING leads.

2. An impedance maintenance circuit as defined in claim 1 wherein said impedance maintenance means includes a sensing transistor coupled through a voltage offset element to the base of the second current sourcing transistor and includes a current sink coupled to the sensing transistor and to the second current sourcing transistor for increasing the current drain on the second current sourcing transistor so as to maintain the impedance level across the TIP and RING leads.

3. An impedance maintenance circuit as defined in claim 2 and wherein the impedance maintenance means defines a circuit loop including the collector-base junction of the second current sourcing transistor, the voltage offset element, and the base-emitter junction of the sensing transistor, so that the sensing transistor begins to conduct when the voltage across the collector-base junction of the second current sourcing transistor approaches a predetermined value established by the voltage offset element.

4. An impedance maintenance circuit as defined in claim 3 wherein the current sink includes a transistor coupled to the second current sourcing transistor and to the sensing transistor so that the current sink begins to draw current from the current sourcing transistor when the sensing transistor becomes conductive.

5. An impedance maintenance circuit as defined in claim 4 wherein the voltage offset element includes a resistor having one end coupled to the second current sourcing transistor and a second end coupled to a current sink, the current sink for establishing the magnitude of an voltage offset effected by the voltage offset element.

6. In a power supply circuit coupled between two input terminals for conducting at least minimum current flow between those terminals and for supplying current to a pendant circuit, an impedance maintenance circuit comprising:
   a bypass transistor coupled between the two input terminals for conducting current between those terminals,
   a current sourcing transistor coupled to the bypass transistor for supplying current to the pendant circuit, and
   impedance maintenance means coupled between the collector and the base of the current sourcing transistor for sensing the tendency of said current sourcing transistor toward saturation and for increasing the load between the collector of said current sourcing transistor and one of the input terminals so as to prevent saturation of the current sourcing transistor and therefore maintain the impedance between those terminals.

7. An impedance maintenance circuit as defined in claim 6 and wherein said impedance maintenance means includes a sensing transistor coupled through a voltage offset element to the base of the current sourcing transistor and includes a current sink coupled to the sensing transistor and to the current sourcing transistor for increasing the current drain on the current sourcing transistor so as to maintain the impedance level across the input terminals.

8. An impedance maintenance circuit as defined in claim 7 and wherein the impedance maintenance means defines a circuit loop including the collector-base junction of the current sourcing transistor, the voltage offset element, and the base-emitter junction of the sensing transistor, so that the sensing transistor begins to conduct when the voltage across the collector-base junction of the current sourcing transistor approaches a predetermined value established by the voltage offset element.

9. An impedance maintenance circuit as defined in claim 8 wherein the current sink includes a transistor coupled to the current sourcing transistor and to the sensing transistor so that the current sink begins to draw current from the current sourcing transistor when the sensing transistor becomes conductive.

10. An impedance maintenance circuit as defined in claim 9 wherein the voltage offset element includes a resistor having one end coupled to the current sourcing transistor and a second end coupled to a current sink, the current sink for establishing the magnitude of an voltage offset effected by the voltage offset element.

11. In an interface circuit for customer premises telecommunications equipment, the interface circuit for coupling to a telephone central office through first and second input terminals and including a bypass element coupled across the input terminals for maintaining a minimum current flow sufficient to preserve the connection of the interface circuit to the central office, a nonsaturating supply of current for pendant portions of the interface circuit, the supply coupled across the input terminals and to the bypass element and comprising:
   a source transistor having a first terminal coupled to the first input terminal, a second terminal coupled to the bypass element, and a third terminal coupled to the pendant portions of the interface circuit for supplying current to those portions,
   a current sink coupled between the third terminal of the source transistor and an input terminal for selectively enhancing the current drawn on the source transistor,
   a voltage offset element, and
   a normally nonconducting sensing transistor having an emitter coupled to the collector of the source transistor and a base coupled through the voltage offset element to the base of the source transistor and a collector coupled to the current sink, whereby a circuit loop is formed and
   includes the base-collector junction of the source transistor, the emitter-base junction of the switching transistor, and the voltage offset element so that in the event that the base-collector junction of the source transistor should approach a forward-biased condition, the sensing transistor is caused to conduct current for driving the current sink and enhancing the current drain on the source transistor and accordingly preclude the saturation of the source transistor.

12. A nonsaturating supply as defined in claim 11 wherein the voltage offset element comprises a resistance coupled between the base of the source transistor and the base of the sensing transistor and an offset current sink coupled to the resistance for establishing a voltage across the resistance.

13. A nonsaturating supply as defined in claim 12 wherein the offset current sink establishes a voltage across the resistance such that the sensing transistor conducts when the magnitude of the reverse bias across the base-to-collector junction of the source transistor becomes approximately 0.5 Vbe.

14. A nonsaturating supply as defined in claim 13 wherein the offset current sink comprises:
   a first transistor having a collector coupled to the offset resistance and an emitter coupled through a resistor R4 to an input terminal, and
   a second transistor having a collector coupled to the base of the first transistor, a base coupled through a resistor R6 to an input terminal, and a resistor R5 connected between its base and collector and
   wherein the magnitudes of R4, R5 and R6 are such that 2R5=R6 and R4 is substantially equal to the magnitude of the resistance in the voltage offset element.

15. A nonsaturating supply circuit for electrical devices, the supply circuit comprising:
   a current supplying transistor having an input terminal coupled to a voltage source and an output terminal at which current is supplied,
   a sensing transistor having an emitter terminal coupled to the collector of the current supplying transistor,
   a voltage offset element coupled between the base of the current supplying transistor and the base of the sensing transistor, and
   a current sink coupled to the collector of the current supplying transistor and to the sensing transistor, whereby a circuit loop is formed so that a tendency of the current supplying transistor toward
   saturation causes the sensing transistor and the current sink to become conductive, thereby increasing the current demand on the current supplying transistor so as to inhibit saturation.

* * * * *